United States Patent [19]
Levy, Jr.

[11] 3,708,438
[45] Jan. 2, 1973

[54] PROCESS FOR THE PREPARATION OF LEAD CONTAINING PIEZOELECTRIC POWDERS
[75] Inventor: Newton Levy, Jr., Ellicott City, Md.
[73] Assignee: W. R. Grace & Co.
[22] Filed: Jan. 27, 1971
[21] Appl. No.: 110,290

Related U.S. Application Data
[63] Continuation-in-part of Ser. No. 699,782, Jan. 23, 1968, abandoned.

[52] U.S. Cl.....................252/62.9, 106/39 R, 23/51
[51] Int. Cl. ........................C04b 35/46, C04b 35/48
[58] Field of Search ....252/62.9; 23/51, 286; 264/56; 106/39; 34/57

[56] References Cited
UNITED STATES PATENTS 2,460,546   2/1949   Stephanoff..........................34/57 X
3,068,177   12/1962  Sugden...............................252/62.9
3,117,094   1/1964   Roup et al..........................252/62.9
3,305,349   2/1967   Bovarnick et al. .......................75/.5
3,352,632   11/1967  Sasaki ...................................23/51
3,378,335   4/1968   Ellis et al................................23/51

Primary Examiner—Oscar R. Vertiz
Assistant Examiner—J. Cooper
Attorney—Joseph R. Nigon et al.

[57] ABSTRACT

A process for preparing lead oxide containing piezoelectric ceramic bodies capable of being sintered to greater than 90 percent of theoretical density at temperatures of 800 to 1,100° C by subjecting an intimate mixture of lead compounds with other materials to thermal dehydration or decomposition in a high temperature fluid energy mill.

6 Claims, No Drawings

PROCESS FOR THE PREPARATION OF LEAD CONTAINING PIEZOELECTRIC POWDERS

CROSS REFERENCE TO OTHER APPLICATIONS

This application is a continuation-in-part of application Ser. No. 699,782 filed Jan. 23, 1968, now abandoned.

BACKGROUND OF THE INVENTION

This invention relates to a process for the preparation of piezoelectric ceramic bodies by high temperature decomposition or dehydration of intimately mixed precursors as solutions, slurries, or powders.

It has been shown that fine size powders exhibit unique properties when compared to powders of the same composition but of larger sizes. These small particles sinter to high densities at lower temperatures, form solid solutions at lower temperatures, and form strong ceramic bodies by virtue of their small grain size. Pure powders with an average particle size of less than 1 micron are difficult to prepare by conventional techniques and are often prohibitively expensive in raw material and processing costs. The conventional wet chemical preparative techniques lead to problems in washing, filtering, drying, preventing agglomeration, and comminuting the aggregates formed.

In addition, when a single phase multi-component oxide powder is desired the same problems exist with respect to the size and processing of the powders along with difficulties in achieving stoichiometry and homogeniety. Coprecipitation or co-decomposition may yield powders with the desirable properties but those obtained by prior art methods are limited in their application and quite frequently are economically unattractive.

The solid state reaction between two or more inorganic oxides is diffusion controlled. Thus, shorter diffusion paths lead to more homogeneous products with less severe heat treatments. One would expect the solid solution to be kinetically favored with extremely small particles in very intimate contact. The conventional method of physically blending and comminuting component oxides rarely produces sub-micron particles or homogeniety on a sub-micron scale.

Solid solution perovskite structures based on lead, titanium and zirconium compounds have found use as transducers in the electronic-ceramic industry. The fundamental lead titanate-lead zirconate compositions may be varied depending on the properties desired, and various additives may be employed to improve, modify, or extend the electrical-mechanical properties of the transducers. These additives usually include one or more oxides of Sr, Bi, Nb and Sn for example. In addition, materials such as barium titanates, lead niobates, tantalates, and stannates, have been investigated and are used in some piezoelectric applications.

In the usual ceramic processing the component oxide powders are blended, calcined around 800° C., comminuted, and then either hot or cold pressed and sintered to high densities in the 1,300° to 1,400° C. temperature range. The sintering temperatures required in the processes of the prior art lead to the loss of volatile lead compounds unless special precautions are taken. These techniques include sintering in lead oxide or other oxide vapors, hot pressing for short times, or covering the bodies with powders of the same composition. Each of these methods has several disadvantages, including difficult control of grain size, high cost of equipment and large batches of inhomogeneous material.

It is therefore an object of this invention to prepare high purity, fine-particled, piezoelectric powders sinterable to greater than 90 percent of theoretical at temperatures of 800° to 1,100° C., useful in the fabrication of electronic-ceramic bodies by a process wherein the volatilization of lead compounds is minimized or negligible. This and other objects of the invention will become apparent from the following detailed description and specific examples.

BROAD DESCRIPTION OF THE INVENTION

The process comprises feeding mixtures of the lead compounds with other materials in either solution, slurry or solid mixture form into a high temperature fluid energy mill and subjecting the mixture to thermal decomposition and dehydration, resulting in a lead oxide containing piezo-electric powder that is sub-micron in size. High purity, fine-particled, lead oxide containing, piezoelectric powders sinterable to greater than 90 percent of theoretical density at temperatures of 800° to 1,100° C. may be prepared from a large number of starting materials to produce a variety of compositions. The resulting powders require no further treatment such as comminution or blending, and may be directly sintered into ceramic bodies.

The sub-micron size materials of this invention are lead oxide containing piezoelectric powders which contain lead oxide in chemical combination with other oxides such as zirconia, titania, strontia and bismuthia.

DESCRIPTION OF THE PREFERRED EMBODIMENT

The fluid energy mill is a standard article of commerce and is modified to operate at temperatures high enough to effect the necessary decomposition and/or dehydration to the lead oxide containing powders. The feed material for the high temperature fluid energy mill may either be in the form of a solution, a slurry or a solid mixture.

When either a slurry or a solid mixture is to be fed to the high temperature fluid energy mill, it can be satisfactorily prepared by using a device designated as a hydrous oxide reactor. This device is capable of producing instantaneous, homogeneous, finely divided precipitates on a continuous basis. The equipment consists of metering pumps which deliver volumes of feed materials into a mixing chamber. The chamber, jacketed for heating and cooling, is equipped with a high speed stirrer. The entering fluids are ejected from nozzles into the chamber which has been designed to effect extremely rapid mixing in very short times. After precipitation the slurries are fed directly into the mill. If solid mixtures are to be fed to the mill the slurry from the hydrous oxide reactor is dried to a flowable powder. The powder is then fed to the mill.

It has been found that when operating an 8 inch high temperature fluid energy mill for example, it is convenient to feed the slurry at a rate of 5 to 300 ml. per minute and preferably about 120 to 220 ml. per minute. Solids can be fed at rates of 50 to 300 grams per minute, preferably about 100 to 200 grams per minute. The mill is operated at inlet temperatures of 1,400°– 1,500° F. and outlet temperatures of 700° to 1,100° F.

Solutions may be milled directly in air or steam using the same mill conditions. The decomposable compounds employed may be the nitrates, acetates, or other carboxylates, hydroxides, or carbonates of lead and the other components.

The process of this invention produces colloidally homogeneous, solid solutions or precursors to solid solutions.

The sintering temperatures for lead containing ceramic powders depends on the composition and application of the final product, e.g., the temperature required to achieve a density in excess of 90 percent of theoretical for a $PbZrO_3$-$PbTiO_3$ composition is reported as 1,250° to 1,295° C., in air. In contrast, the powders prepared by our novel process can be sintered to greater than 90 percent of theoretical at temperatures as low as 800° C. in air. Densities in excess of 98 percent of theoretical can be achieved by sintering at about 900° C., also in air.

Other lead containing zirconates and titanates prepared by our novel process exhibit proportionally lower firing temperatures than corresponding compositions made by prior art methods.

The products prepared by our novel process are thus sinterable to high densities at temperatures of 800° to 1,100° C., preferably 900° to 1,050° C.

This invention is illustrated, but not limited by the following specific examples.

EXAMPLE I

Commercial lead and zirconyl nitrate salts are dissolved in deionized water such that the lead to zirconium mole ratio is unity. The resulting solution is then fluid energy milled in steam at inlet temperatures of 1,200°–1,300° F. The powder obtained is homogeneous sub-micron lead zirconate. Cold pressed bodies are sintered to greater than 95 percent of theoretical density in air below about 1,050° C. with no appreciable lead loss.

EXAMPLE II

Freshly precipitated and washed hydrous titania cake is prepared from aqueous titanium tetrachloride and ammonia. The precipitate is washed free of chloride and maintained as a moist cake. The moist cake is added to and dissolved in a solution of bismuth, lead and zirconyl nitrates with a mole ratio of nitric acid to titania of approximately two, such that the nominal cation composition of the solution is $(Pb_{.98}Bi_{.02})(Zr_{.65}Ti_{.35})$. At this stage the solution may be clear or slightly turbid, depending on the nitric acid concentration and percent total contained solids. The solution is then fluid energy milled in steam or hot air at inlet temperatures of 900 to 1,500° F. The powder obtained is a homogeneous perovskite solid solution precursor. Cold pressed bodies can be sintered to densities of greater than 90 percent of theoretical at about 900° C. with no appreciable loss of metal compounds.

EXAMPLE III

Freshly precipitated and washed hydrous titania cake is prepared as in Example II. The moist cake is added to an aqueous solution of lead, strontium, and zirconyl nitrates, such that the nominal cation composition is $(Pb_{.94}Sr_{.06})(Zr_{.52}Ti_{.48})$. Nitric acid is added in approximately a 2 molar excess to the titania present. The resulting mixture or preferably solution is then reacted with $NH_4OH$ on the hydrous oxide reactor such that the effluent pH is 8–9. The coprecipitated slurry is then fluid energy milled in steam at inlet temperatures of 900° to 1,500° F. The resulting powder is a homogeneous perovskite solid solution precursor and can be cold pressed and sintered to greater than 90% theoretical density below 1,050° C.

EXAMPLE IV

The solutions in Examples I and II are reacted with $NH_4OH$ on the hydrous oxide reactor such that the effluent pH is 8–9. The slurries are then dewatered to moist cakes. The cakes are dried in a forced draft oven at 100°–150° F. The powders are then fluid energy milled in steam at inlet temperatures of 900° to 1,500°F. Both powders are homogeneous perovskite solid solutions precursors.

EXAMPLE V

In order to avoid the solubility problems when the Ti/Zr mole ratio is about 1.0 and to circumvent working in dilute solutions, hydrogels may be used.

An aqueous solution of titanyl and zirconyl chlorides was prepared from commercial zirconyl chloride octahydrate and titanium tetrachloride to contain approximately 16 w/o solids as oxides and a Zr/Ti mole ratio of 1.083. The mixed chloride solution was then reacted with aqueous $NH_4OH$ such that the effluent pH was 8–9. The slurry of the coprecipitated hydrous oxides was washed free of chloride ion and kept as a damp cake or solid containing approximately 50 percent $H_2O$.

The mixed $TiO_2$-$ZrO_2$ hydrous oxide cake was mixed with commercial lead and strontium nitrates, such that the nominal cation composition was $(Pb_{.94}Sr_{.06})(Zr_{.52}Ti_{.48})$. The slurry was heated to 30°–80° C. and sufficient water was added so that a uniform flowable paste was formed containing the soluble lead and strontium salts distributed homogeneously in the hydrogel. At this point the slurry may be fluid energy milled in steam at inlet temperatures of 900°–1500° F. to yield homogeneous perovskite precursor powder, or it may be coprecipitated as follows prior to milling. The agitated slurry was then reacted with aqueous $NH_4OH$ in the hydrous oxide reactor such that the effluent pH was 8–9. This slurry was then fluid energy milled in steam at inlet temperatures of 900°–1,500° F. The resulting powder was homogeneous perovskite solid solution precursor. Cold pressed discs sintered to greater than 90 percent theoretical density at 800° C. and to greater than 90 percent theoretical density at 900° C. with no appreciable loss of lead compounds.

What is claimed is:

1. A process for preparing lead zirconate, lead titanate or lead titanate-zirconate ceramic powders with an average particle size of less than 1 micron capable of being sintered to greater than 90% of theoretical density at temperatures of 800° to 1,100° C which comprises:

a. subjecting powders, solutions, or slurries of lead zirconium or titanium compounds selected from the group consisting of nitrates, carboxylates, hydroxides, and carbonates or mixtures thereof to thermal decomposition and dehydration in a fluid energy mill operated at inlet temperatures of 1,400° to 1,500° F and outlet temperatures of 700° to 1,100° F, in an atmosphere of steam or hot air, and b. recovering the product ceramic powders.

2. A process for preparing lead zirconate, lead titanate, or lead titanate-zirconate ceramic bodies which comprises:

a. subjecting powders, solutions, or slurries, of lead zirconium or titanium compounds selected from the group consisting of nitrates, carboxylates, hydroxides, and carbonates or mixtures thereof to thermal decomposition and dehydration in a fluid energy mill operated at inlet temperatures of 1,400° to 1,500° F and outlet temperatures of 700° to 1,100° F, in an atmosphere of steam or hot air, b. recovering the product ceramic powders the average particle size of which is less than one micron, c. cold pressing and sintering said powders in air at a temperature of 800° to 1,100° C to greater that 90 percent of theoretical density, and d. recovering the sintered product.

3. A process for preparing lead zirconate in the sub-micron size range which comprises:

a. subjecting an aqueous solution of lead nitrate, carboxylate, hydroxide or carbonate and zirconium nitrate, carboxylate, hydroxide, or carbonate to thermal decomposition and dehydration in a fluid energy mill operated at inlet temperatures of 1,400° to 1,500° F and outlet temperatures of 700° to 1,100° F, in an atmosphere of steam or hot air, and b. recovering the lead zirconate.

4. A process for preparing lead zirconate which comprises preparing an aqueous solution of lead nitrate and zirconium nitrate, subjecting said nitrate solution to thermal decomposition and dehydration in a fluid energy mill operated at inlet temperatures of 1,400° to 1,500°F and outlet temperatures of 700° to 1,100° F, recovering lead zirconate powder having an average particle size of less than 1 micron and sintering said lead zirconate powder in air at a temperature of 800° to 1,100° C to greater than 90 percent of theoretical density.

5. A process for preparing lead titanate in the submicron size range which comprises:

a. subjecting an aqueous solution of lead nitrate, carboxylate, hydroxide, or carbonate and titanium nitrate, carboxylate, hydroxide, or carbonate to thermal decomposition and dehydration in a fluid energy mill operated at inlet temperatures of 1,400° to 1,500° F and outlet temperatures of 700° to 1,100° F in an atmosphere of steam or hot air, and b. recovering the lead titanate product.

6. A process for preparing lead titanate which comprises preparing an aqueous solution of lead nitrate and titanium nitrate, subjecting said nitrate solution to thermal decomposition and dehydration in a fluid energy mill operated at inlet temperatures of 1,400° to 1,500° F and outlet temperatures of 700° to 1,100° F., recovering lead titanate powder having an average particle size of less than 1 micron and sintering said lead titanate powder in air at a temperature of 800° C to 1,100° C to greater than 90 percent of theoretical density.

* * * * *